US012692023B2

(12) United States Patent
Gottumukkala et al.

(10) Patent No.: US 12,692,023 B2
(45) Date of Patent: Jul. 28, 2026

(54) STRUCTURE SYSTEM FOR INSTALLATION INTO A FUSELAGE STRUCTURE

(71) Applicants: Airbus Operations GmbH, Hamburg (DE); Airbus Operations SAS, Toulouse (FR)

(72) Inventors: Swetha Gottumukkala, Toulouse (FR); Jens Lohmar, Hamburg (DE); Matthias Hegenbart, Hamburg (DE); Hermann Benthien, Hamburg (DE); Zoltan Czudar, Hamburg (DE); Vivien Leising, Hamburg (DE); Sara Abshagen, Hamburg (DE); Andre Zybala, Hamburg (DE)

(73) Assignees: AIRBUS OPERATIONS GMBH, Hamburg (DE); AIRBUS OPERATIONS SAS, Toulouse (FR)

( * ) Notice: Subject to any disclaimer, the term of this patent is extended or adjusted under 35 U.S.C. 154(b) by 230 days.

(21) Appl. No.: 18/545,303

(22) Filed: Dec. 19, 2023

(65) Prior Publication Data

US 2024/0199235 A1 Jun. 20, 2024

(30) Foreign Application Priority Data

Dec. 19, 2022 (EP) ..................................... 22214474

(51) Int. Cl.
*B64F 5/50* (2017.01)
*B64F 5/10* (2017.01)
(52) U.S. Cl.
CPC . *B64F 5/50* (2017.01); *B64F 5/10* (2017.01)

(58) Field of Classification Search
None
See application file for complete search history.

(56) References Cited

U.S. PATENT DOCUMENTS

| 8,770,532 | B2 | 7/2014 | Ruiz et al. |
| 9,077,167 | B2 | 7/2015 | Blanchard et al. |
| (Continued) | | | |

FOREIGN PATENT DOCUMENTS

| EP | 1803645 A1 | * | 7/2007 | ............. | B64D 11/06 |
| WO | WO-2008022752 A1 | * | 2/2008 | ............. | B64C 1/066 |

OTHER PUBLICATIONS

Extended European Search Report from priority European patent application EP22214474.3 dated May 30, 2023.

*Primary Examiner* — Steven M Marsh
(74) *Attorney, Agent, or Firm* — Greer, Burns & Crain, Ltd.

(57) ABSTRACT

A structure system for installation into a fuselage structure in an interior of an aircraft. The system has a first carrier element, a second carrier element, an elongate frame element having a first end and a second end, a first attachment device for attaching the first carrier element to the fuselage structure or to an element coupled with the fuselage structure, a first coupling device mounted to the first end for coupling the first carrier element to the frame element, and a second coupling device mounted to the second end for coupling the second carrier element to the frame element. The frame element holds a component to be installed in the interior. The first carrier element couples with the first coupling device, the second carrier element couples with the second coupling device, and one of the coupling devices snaps into the respective carrier element.

14 Claims, 11 Drawing Sheets

(56)                    References Cited

U.S. PATENT DOCUMENTS

| 9,517,829 | B2 * | 12/2016 | Fink | B64C 1/18 |
| 12,371,164 | B2 * | 7/2025 | Benthien | B64D 11/003 |
| 2005/0224677 | A1 | 10/2005 | Zeuner et al. | |
| 2008/0277527 | A1 * | 11/2008 | Fokken | B61D 17/18 |
| | | | | 244/118.1 |
| 2014/0291447 | A1 * | 10/2014 | Goehlich | B64C 1/18 |
| | | | | 244/119 |
| 2018/0009520 | A1 * | 1/2018 | Metten | B64C 1/06 |
| 2019/0127038 | A1 | 5/2019 | Benthien et al. | |
| 2019/0193871 | A1 * | 6/2019 | Benthien | B64D 11/003 |
| 2020/0056726 | A1 | 2/2020 | Loss et al. | |
| 2021/0188417 | A1 | 6/2021 | Maurel et al. | |
| 2023/0105251 | A1 * | 4/2023 | Hegenbart | B64C 1/061 |
| | | | | 244/118.1 |

* cited by examiner

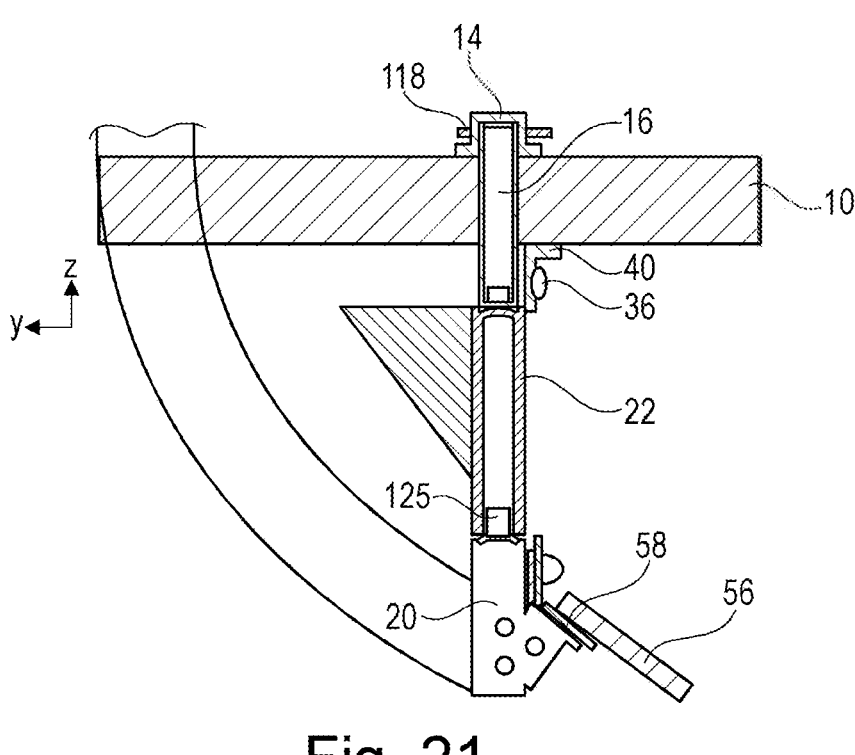
Fig. 21
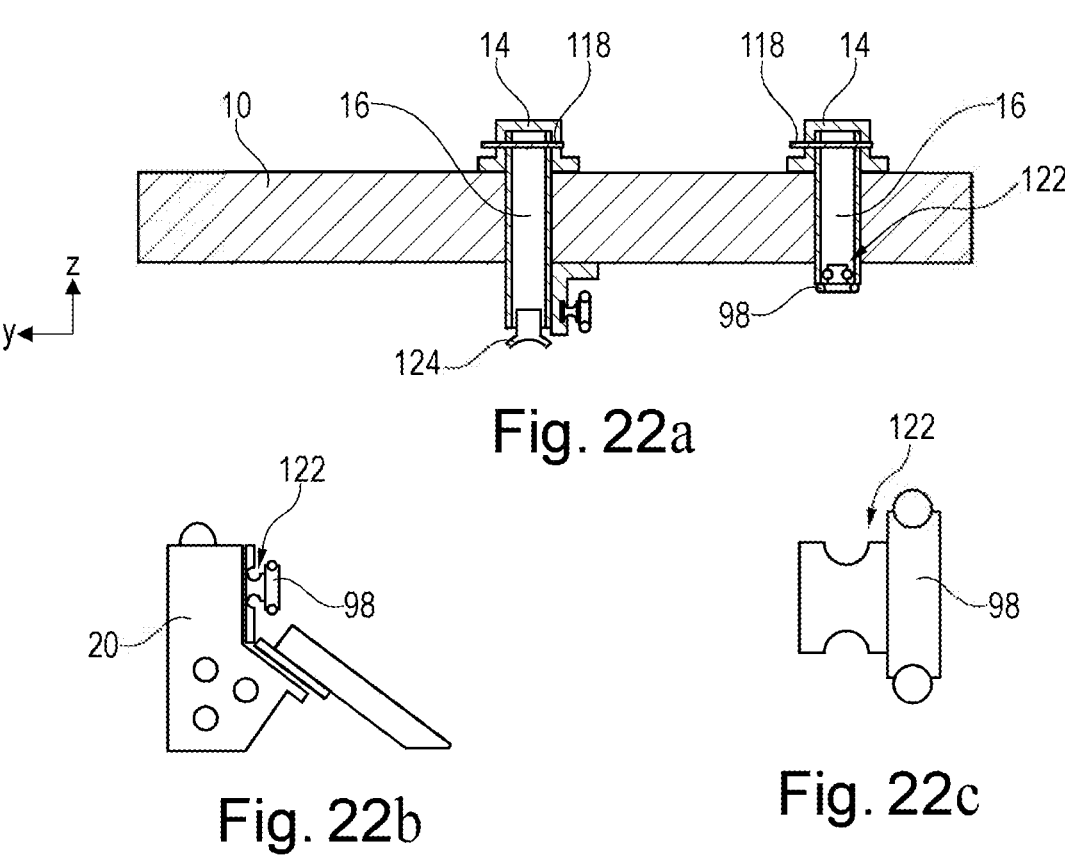
Fig. 22a
Fig. 22b
Fig. 22c

STRUCTURE SYSTEM FOR INSTALLATION INTO A FUSELAGE STRUCTURE

CROSS-REFERENCES TO RELATED APPLICATIONS

This application claims the benefit of European Patent Application Number 22 214 474.3 filed on Dec. 19, 2022, the entire disclosure of which is incorporated herein by way of reference.

FIELD OF THE INVENTION

The invention relates to a structure system for installation into a fuselage structure in an interior of an aircraft, an installation method as well as an aircraft having at least one such structure system.

BACKGROUND OF THE INVENTION

Commercial aircraft with a fuselage structure and a cabin created therein usually comprise a large variety of installation equipment. This may include, besides others, cabin monuments, passenger seats, in-flight entertainment equipment, stowage compartments and so on. Overhead stowage compartments, for example, are often attached to a framework structure in an upper region of the respective cabin. Often, they are brought into the cabin part by part and are installed one after another. Manufacturing-induced dimensional deviations are compensated by suitable adjustment means, such that the stowage compartments create a harmonic and straight appearance.

However, further types of installation equipment can be found inside the interior of the fuselage that are not visible for a passenger, for example system equipment in an underfloor region, i.e. underneath the cabin, for example in the so-called triangle region. The triangle region is arranged between a cargo compartment and the fuselage structure underneath the cabin floor and may exemplarily comprise a plurality of ducts, pipes, and electrical lines. Often, these components are provided one after another into the aircraft and are attached to structural elements in the triangle region, such as the fuselage structure or lateral delimitation of the cargo compartment. Dedicated holders need to be provided and attached and the system components are coupled with the holders directly inside the fuselage. Since the available space is cramped, this part of the installation is cumbersome and time-consuming. Also, providing a plurality of holders for integration into structural elements requires a plurality of different brackets, tools, and other means for an efficient and quick installation.

SUMMARY OF THE INVENTION

It is thus an object of the invention to provide a mounting system or the like for mounting components into an interior structure of an aircraft and an improved method for installing equipment components into the interior structure of the aircraft.

This object may be met by the structure system having the features of one or more embodiments described herein. Advantageous embodiments and further improvements may be gathered from the following description.

A structure system for installation into a fuselage structure in an interior of an aircraft is proposed, the system comprising at least one first carrier element, at least one second carrier element, at least one elongate frame element having a first end and a second end, at least one first attachment device for attaching the first carrier element to the fuselage structure or to an element coupled with the fuselage structure, at least one first coupling device mounted to the first end for coupling the first carrier element to the at least one frame element, and at least one second coupling device mounted to the second end for coupling the second carrier element to the at least one frame element, wherein the at least one frame element is adapted for holding at least one component to be installed in the interior, wherein the at least one first carrier element is designed for coupling with the at least one first coupling device, wherein the at least one second carrier element is designed for coupling with the at least one second coupling device, and wherein one of the at least one first coupling device and the at least one second coupling device is adapted to snap into the respective carrier element, to be moved relative to the respective end of the frame element and to be arrested in a desired relative position thereto.

In at least one aspect, the invention may be broadly characterized by providing a modular structural system that is capable of attaching the respective equipment components to at least one and preferably a plurality of elongate frame elements outside the aircraft to form an assembly, bring the assembly into the aircraft and attach it to the fuselage structure through suitable carrier elements. Here, one of the two carrier elements is capable of providing a simple snap connection that allows to even further simplify the installation process. The assembly is preferably designed to be load carrying to form an integral part of the structure of the aircraft.

The first carrier element may exemplarily be a mechanical component, which is attached to the fuselage structure with a first attachment device. The elongate frame element is couplable with the first carrier element in the region of the first end. The coupling may comprise a direct or indirect mechanical connection and allows a load transfer in at least one direction and preferably in at least two and in particular in three directions. The design of the first attachment device, the first carrier element and the first coupling device are preferably adapted to optimize the load transfer in this at least one direction. It is conceivable that the elongate frame element, the first carrier element and the first attachment device provide a rotatable coupling of the frame element to the fuselage structure.

The second carrier element may have a similar or different design. The second carrier element is capable of being coupled with the frame element at the second end. By providing the first carrier element in a distance to the second carrier element, the frame element is coupled to the respective structure over at least two positions, which provides a determined spatial support of the frame element. Again, it is conceivable that the elongate frame element and the second carrier element provide a rotatable coupling of the frame element to the fuselage structure.

Preferably, a plurality of elongate frame elements are installed in the fuselage structure by a matching number of first carrier elements and second carrier elements. The frame elements may be spaced apart from and aligned parallel to each other. In the installed state, they may create a simple and flat framework, which is herein referred to as module frame, and which is defined by a first edge created by the plurality of first ends and a second edge created by the plurality of second ends, wherein the first edge and the second edge are preferably parallel to each other. Between both edges, two opposite lateral faces are provided. One of or both the lateral faces are intended for holding equipment components. In general, the module frame may provide two sides acting as an interface for installing equipment components.

The elongate frame element may comprise a cross-sectional surface that provides a sufficient geometrical moment of inertia to be load-carrying and to hold the equipment components. For example, the elongate frame elements may be realized as vertical struts or rods for an inner delimitation of a so-called triangle region of the fuselage structure, which is to be found underneath radial outer regions of a cabin floor between the fuselage skin and a cargo compartment. The first end may comprise the first coupling device, while the second end may comprise the second coupling device. For a pre-installation of the module frame with the equipment components the elongate frame elements may either be connected through a closing angle to remain in the fuselage structure after installation, or the elongate frame elements may temporarily be held in a jig until they are connected to at least one of the carrier elements.

As indicated above, it is preferred to arrange the frame elements in a vertical manner inside the interior structure, such that the first edge and the second edge of the module frame created by the frame elements extend parallel to the x-axis, while the lateral faces extend parallel to the x-x-plane. The axis definitions refer to an aircraft-fixed coordinate system, wherein the x-axis is the longitudinal axis, the y-axis is the lateral axis and the z-axis is the vertical axis. The first ends may be placed above the second ends. When installed, for example, the frame elements, and thus the module frame, may constitute a lateral delimitation of a cargo compartment. One of the lateral faces then faces into the triangle region and equipment components attached to the respective lateral face are placed inside the triangle region. In this example, the first carrier element may be placed above the second carrier element and may be designed to receive forces in three directions. During installation, first carrier elements may temporarily hold frame elements alone. It may be feasible to move the frame elements with installed equipment components into the interior of the fuselage structure through a mounting jig, attach the first coupling devices to the first carrier elements and remove the jig out of the aircraft. Afterwards, the second coupling devices can be coupled to the second carrier elements. Staying with the example mentioned above, i.e. using several vertically arranged frame elements, all frame elements are subsequently attached to respective first carrier elements, while after removing the jig all second coupling devices are coupled with the respective second carrier elements.

Due to manufacturing-induced dimensional deviations, it is feasible to let one of the respective coupling devices be variable in length to compensate slight distance deviations between the first and second carrier elements along the extension of the fuselage structure. It is preferred that this length-variable feature is provided in combination with a snap-in connecting element. Thus, after connecting the first coupling devices with the first carrier elements, the frame elements, and thus the module frame, may hang from the first carrier elements downwards and the second coupling devices can be coupled to the second carrier elements while at the same time adjusting their positions relative to the second ends and without requiring the jig.

Of course, the module frame may be arranged and oriented differently, such as in a horizontal orientation or inclined to a vertical or horizontal plane. It may also be arranged to extend along the y axis at least in a region of the structure. It may comprise different extensions in length, i.e. along the two edges, and width, i.e. in a direction between the edges.

The structure system according to the invention provides an excellent way of pre-installing equipment components outside the aircraft and reducing required installation time directly inside the interior structure of the aircraft. At the same time, a load-carrying structure may be pre-assembled outside the aircraft and coupled with the fuselage structure in a simple manner.

In an exemplary embodiment, the second coupling device comprises an elongate compensation element having an outer end, which protrudes away from the at least one elongate frame element, and an inner end, wherein the elongate compensation element is slidably supported in the respective frame element to move the outer end into a variable distance from the second end, and wherein a first snap connector is arranged on the outer end that is complementary shaped to a second snap connector arranged in the at least one second carrier element. Thus, the second coupling device is adapted to snap into the respective carrier element, i.e. the second carrier element. The elongate compensation element may exemplarily be realized in the form of a rod or an auxiliary beam, which preferably has a constant cross-sectional surface that at least partially continuously extends along the main extension direction of the elongate compensation element. It is conceivable that the elongate compensation element is hollow to reduce its weight. For a slidable support, the respective frame element, into which the compensation element is inserted, may comprise a complimentary shaped guide, in which the elongate compensation element can slide freely at least during the installation process. In a simple case, the guide may comprise a hole or a recess. In a modified embodiment explained further below, the guide may include means for arresting the elongate compensation element in a desired position.

In an advantageous embodiment, the one of the first snap connector and the second snap connector is adapted to receive the other one of the first snap connector and the second snap connector in a first relative rotational position and to hold it in at least one second relative rotational position that is distinct from the first relative rotational position. The first snap connector and the second snap connector are rotatable relative to each other. It is conceivable, that the first snap connector and the second snap connector comprise complimentary shaped insertion and receiving surfaces. For example, one of the snap connectors comprises an insertion body, which is insertable into a recess of the other snap connector. The shapes of both snap connectors are designed in such a way, that an insertion is only possible in one or only a few distinct first relative rotational positions. By rotating the snap connectors relative to each other, second relative rotational positions are reached. In these, the insert is held inside the recess through an engagement of the insertion body and the recess. For example, the recess comprises at least one undercut, into which a lateral protrusion of the insert can be brought. Hence, both snap connectors are secured to each other in the respective second relative rotational positions.

It is further conceivable that the first snap connector and the second snap connector can be secured with each other, such that an inadvertent rotation can be prevented. This is advantageous to avoid a loosening due to flight-induced vibrations.

In an advantageous embodiment, the second coupling device comprises an arresting element capable of arresting the elongate compensation element relative to the second end. Thus, a desired position of the elongate compensation element relative to the second edge, i.e. the second ends, can be secured. The tolerance compensation remains adjusted.

In an advantageous embodiment, the arresting element is integrated into the elongate compensation element. For example, the elongate compensation element may comprise lateral protrusions that engage with lateral recesses in a guide for guiding the elongate compensation element relative to the second end. By rotating the elongate compensation element it may mechanically engage with the guide to maintain its momentary position. Hence, in particular following above example with the first snap connector and the second snap connector, the elongate compensation element is arrested directly after providing a connection between the first snap connector and the second snap connector.

In an advantageous embodiment one of the first carrier element and the second carrier element comprises at least one rail, wherein the respective coupling device is adapted for being slidably supported by the at least one rail to move the elongate frame element to the respective carrier element. The at least one rail allows to insert pre-equipped frame elements into the respective rail and move it to the desired installation location without requiring a mounting jig.

In an advantageous embodiment, the respective coupling device and the respective carrier element are connectable independent from the rail, wherein the at least one rail is removable from the respective carrier element after connecting the respective coupling device and the respective carrier element. Thus, the respective rail that further simplifies the installation is no longer required when the frame elements are installed. Removing the respective rail leads to a reduction of weight.

In an advantageous embodiment a plurality of consecutive frame elements are connectable through at least one profile component that extends along a plurality of first ends or a plurality of second ends. The plurality of frame elements may then be coupled with one or more respective profile component(s) to create a module frame.

In an advantageous embodiment the first attachment device is connectable to or integratable into a cabin seat rail at a bottom side, such that the at least one frame element is placeable underneath and is couplable with the seat rail. The seat rail is usually connected to a plurality of crossbeams in the interior structure of the aircraft and creates a sturdy base for the installation of the frame element(s). By simply combining the first attachment devices with the seat rail, particularly frame elements dedicated for providing a triangle region structure can be attached.

In an advantageous embodiment at least one of the first coupling device and the second coupling device comprises a fastening element that is adapted to be sticked through the at least one frame element and the respective coupling device. The attachment of the at least one frame element is simple and does not require drilling, screwing and use of tools. For example, the fastening element may latch after insertion, such that a simple insertion motion is sufficient. For example, a fastening element may be provided in the form of a ball lock pin.

The invention further relates to a method for mounting structural and equipment components to a fuselage structure in an interior of an aircraft, comprising the steps of providing at least one frame element having a first end, and a second end, attaching at least one component on the at least one frame element, moving the at least one frame element into the fuselage structure, coupling at least one first coupling device mounted to the first end to a first carrier element attached to the fuselage structure through at least one first attachment device, and coupling at least one second coupling device mounted to the second end to a second carrier element attached to the fuselage structure, wherein the coupling of one of the at least one first coupling device and the at least one second coupling device includes a snapping into the respective carrier element, to be moved relative to the respective end of the at least one frame element and to be arrested in a desired relative position thereto.

In an advantageous embodiment, the method further comprises sliding an elongate compensation element at the second coupling device, which elongate compensation element having an outer end protruding away from the respective frame element and an inner end, to move an outer end into a distance from the second end, such that a first snap connector arranged on the outer end reaches a complementary shaped second snap connector arranged in the at least one second carrier element, and snapping the first snap connector into the second snap connector.

The invention further relates to a vehicle, comprising a fuselage structure, at least one component and at least one structure system according to the above description for installation into a fuselage structure.

In an advantageous embodiment, the at least one component, which is held by the at least one frame element of the structure system, comprises a fluid pipe, a duct, or an electric line.

In an advantageous embodiment, the vehicle is an aircraft, wherein the structure system is adapted to arrange the at least one component in a triangle region of the aircraft.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show:

FIG. 21 shows a modified attachment of a module frame.

FIG. 22a shows a first view of a modified attachment of a module frame.

FIG. 22b shows a second view of the attachment of the module frame of FIG. 22a.

FIG. 22c shows a third view of the attachment of the module frame of FIG. 22a.

DETAILED DESCRIPTION OF THE PREFERRED EMBODIMENTS

Figure 1:
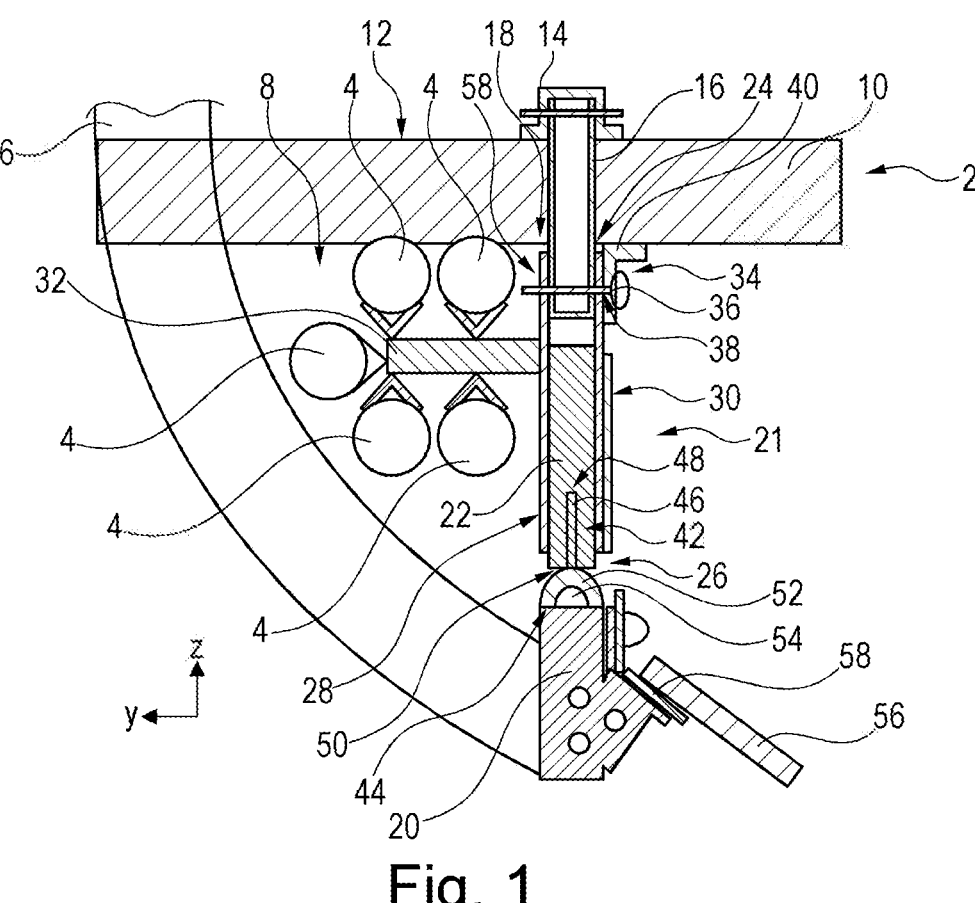
FIG. 1 shows a section view of a structure system in an interior structure of an aircraft.

FIG. 1 shows a structure system 2 for installation to a fuselage structure 6 in an interior of an aircraft. Here, exemplarily the structure system 2 is arranged in a lower deck, which is exemplarily used as a cargo compartment. Certain equipment components 4 are provided that are to be installed inside a so-called triangle region 8. At an upper side in the drawing plane, a crossbeam 10 is provided for supporting a cabin floor of the cabin arranged above the cargo compartment. It is to be understood, that a plurality of crossbeams 10 is arranged along the longitudinal direction, i.e. the x axis, of the fuselage structure 6. At the top side 12 of the crossbeams 10, a seat rail 14 is provided.

In this exemplary embodiment, the seat rail 14 has first attachment devices 16, which carry a first carrier element 18. In this case, the first carrier element 18 is simply a mechanical interface integrated into or attached to the first attachment device 16. It is to be understood, that a plurality of first attachment devices 16 is arranged and distributed along the longitudinal axis of the fuselage structure 6 as well as a plurality of first carrier elements 18.

Opposed to the first carrier elements 18, second carrier elements 20 are provided attached to the fuselage structure 6. Between the first carrier elements 18 and the second carrier elements 20, a module frame 21 is arranged, which is realized by an arrangement of elongate frame elements 22 that are distributed parallel and at a distance to each other along the x axis. The frame elements 22 each comprise a first end 24 and a second end 26. The resulting module frame 21 has a first lateral face 28 and a second lateral face 30, wherein the first ends 24 define a first edge of the module frame 21 and the second ends 26 define a second edge of the module frame 21. In this exemplary embodiment, the first lateral face 28 is dedicated for carrying the equipment components 4. For this, component holders 32 are provided. The attachment of the equipment components 4 to the component holders 32 is explained in further detail below.

The frame elements 22 comprise a first coupling device 34 for coupling the frame elements 22 to the first carrier elements 18. Here, a fastening element 36 in combination with a through-hole 38 is provided, wherein the fastening element 36 sticks through the first coupling device 34 and the first carrier elements 18 in a horizontal orientation, i.e. parallel to the y axis. For example, the fastening element 36 may be a ball lock pin or a bolt. In addition, an elongate profile component in form of a closing angle 40 is provided for providing a wall termination bar or such, which allows to couple a plurality of elongate frame elements 22 with a predetermined spacing to each other. The second lateral face

30 that faces away from the triangle region 8 and into the cargo compartment may function as cargo compartment wall or an attachment base for a cargo compartment wall. As apparent from FIG. 1, the lateral faces 28 and 30 extend along the x and z axes and thus, the module frame 21 created through a plurality of elongate frame elements 22 is arranged vertically. While the connection between the first coupling devices 34 and the first carrier elements 18 is provided as a fixed connection, the opposed side at the second ends 26 is designed differently.

Here, the frame elements 22 comprise a second coupling device 42, which is adapted to snap into a second carrier element 44. Each of the second coupling devices 42 furthermore comprises an elongate compensation element 46, which has an inner end 48 and an outer end 50. The outer end 50 protrudes out of the respective frame element 22, wherein the inner end 48 remains inside the frame element 22. The elongate compensation element 46 can slide in the z-direction, such that the outer end 50 has a variable distance to the second end 26 of the respective frame element 22.

At the outer end 50, a first snap connector 52 is provided that is complementary shaped to a second snap connector 54 arranged at the second carrier element 44. After installing the first coupling device 34 at the first carrier element 18, the position of the outer end 50 relative to the second carrier element 44 can be adjusted, such that the first snap connector 52 engages with the second snap connector 54. Then, the respective frame element 22 is fixedly attached to the fuselage structure 6.

As stated above, it is conceivable that each of the elongate frame elements 22 comprises a first coupling device 34 and a second coupling device 42. The distance between the individual frame elements 22 may correspond to the spacing of circumferential frames of the fuselage structure 6.

Furthermore, FIG. 1 shows a cargo compartment floor 56, which is on the right-hand side in the drawing plane. Here, a further closing angle 58 is provided that also acts as a wall termination bar for the cargo compartment and for coupling the frame elements 22, respectively. The closing angles 40 and 58 may be an integral part of the module frame 21 in the installed state.

Figure 2:
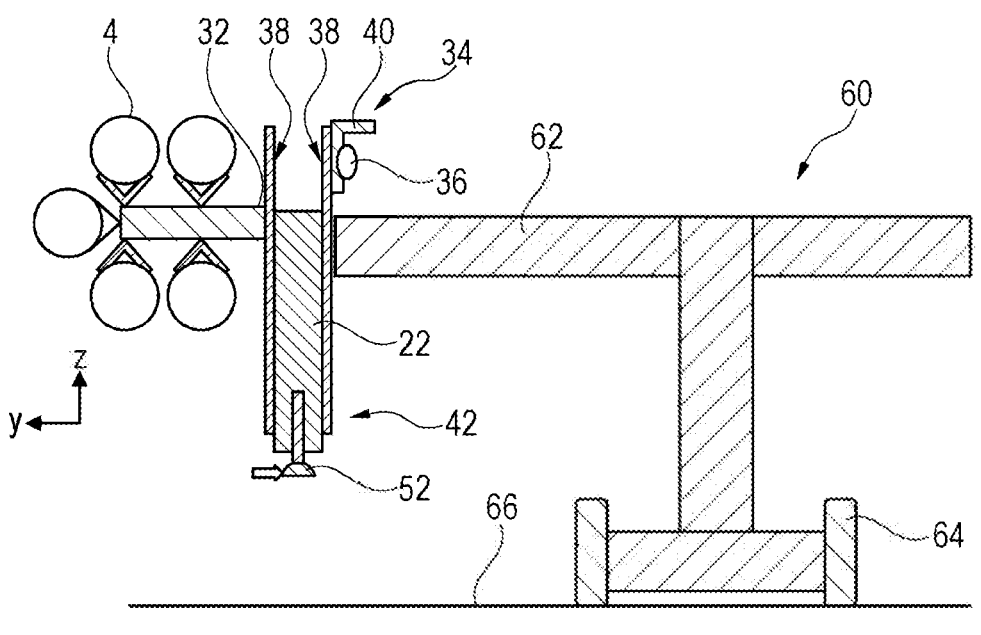
FIG. 2 shows a jig carrying a pre-equipped module frame.

In FIG. 2, a mounting jig 60 is shown, which comprises a carrying frame 62 and several wheels 64 for moving the jig 60 on a floor 66, which may be a temporary floor or a part of the cargo compartment floor 56. Here, the module frame 21 in form of several coupled elongate frame elements 22 comprises the holders 32, the first coupling devices 34, the second coupling devices 42 as well as the components 4 attached to the holders 32. Consequently, the module frame 21 is pre-equipped or pre-installed outside the fuselage structure 6 and can be brought into the interior of the fuselage structure 6 for attaching it. This reduces time and effort for the installation directly inside the fuselage structure 6.

After moving the jig 60 together with the pre-equipped module frame 21 into the fuselage structure 6, the module frame 21 is positioned such that the first coupling devices 34 are in a suitable position to be coupled with the first carrier elements 18. This is indicated by an arrow running from the right hand side to the left-hand side in the drawing plane of FIG. 3.

Figure 4:
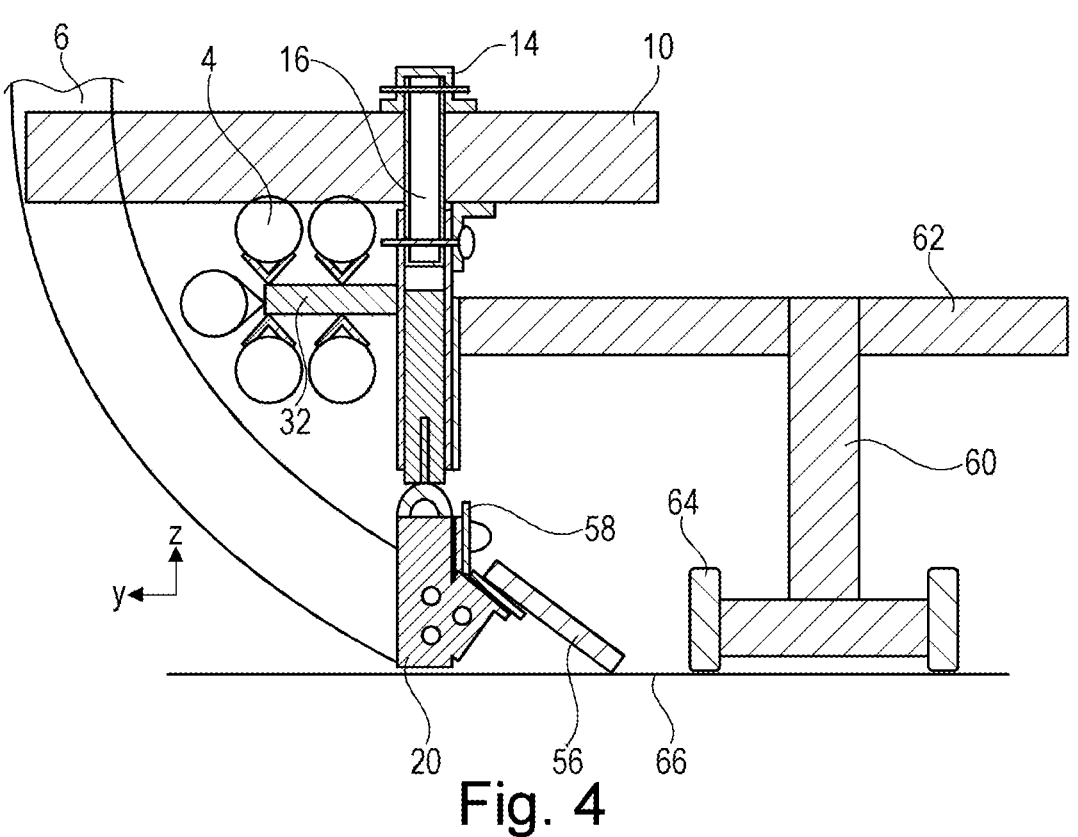
FIG. 4 shows first coupling devices being coupled with first carrier elements.

FIG. 4 shows the connection of the first coupling devices 34 with the first carrier elements 18 by installing the fastening elements 36 in the respective through-holes 38. The number of fastening elements 36 depends on the number of first coupling devices 34 and first carrier elements 18. This may of course depend on the extension of the module frame 21 in the x direction.

Figures 5, 6A, 6B, 6C, 6D:
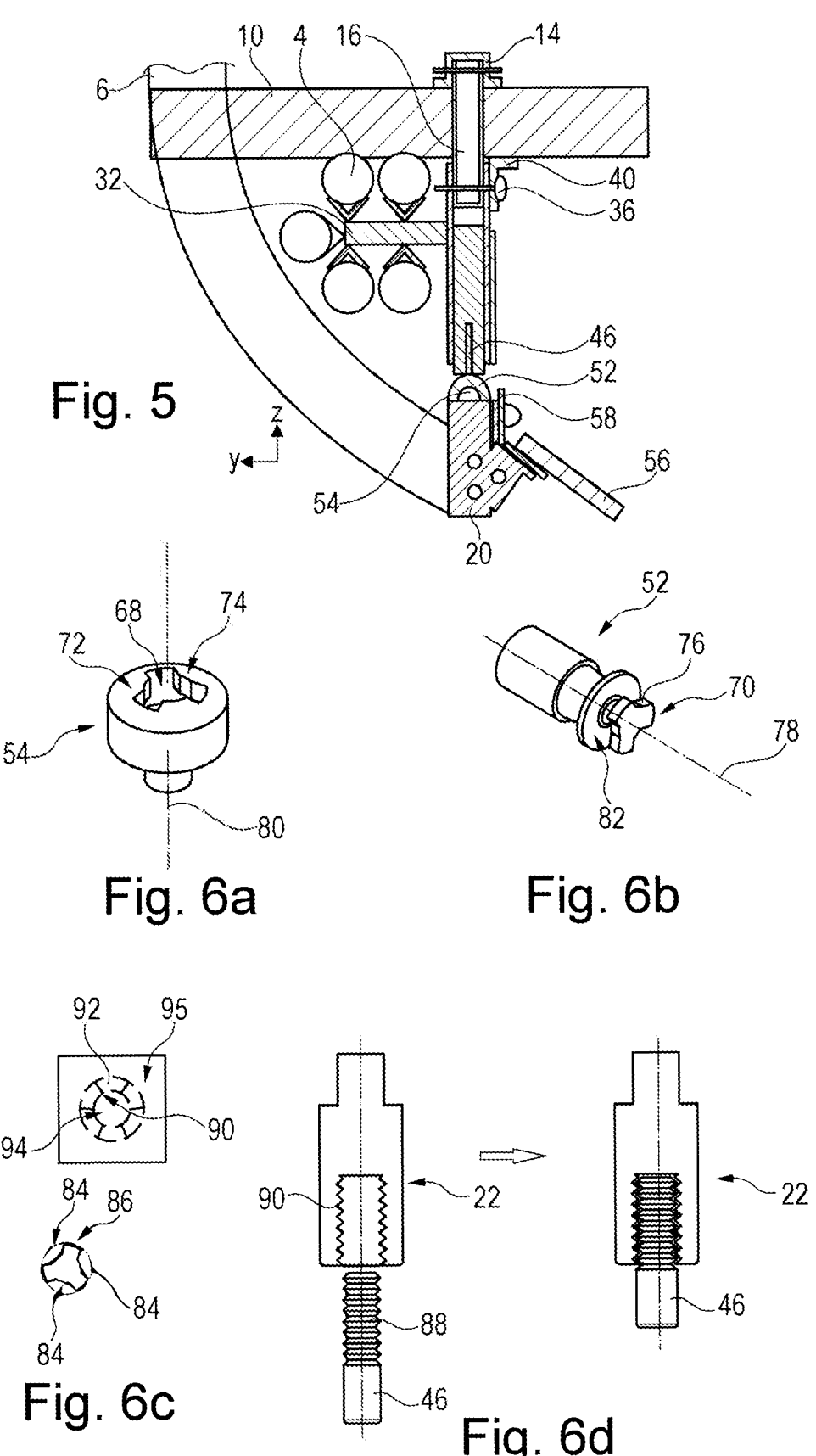
FIG. 5 shows second coupling devices being coupled with second carrier elements.
FIG. 6a shows a first snap connector.
FIG. 6b shows a second snap connector.
FIG. 6c shows an elongate compensation element with integrated arresting element in the module frame.
FIG. 6d show an elongate compensation element with integrated arresting element in the module frame.

Afterwards, as shown in FIG. 5, the first snap connectors 52 and the second snap connectors 54 are connected to each other. This is done directly after sliding the elongate compensation elements 46 relative to the second ends 26 in a way that both snap connectors 52 and 54 are flush to each other.

FIGS. 6a and 6b show an exemplary embodiment of the first snap connector 52 and the second snap connector 54. The second snap connector 54 comprises an opening 68 for receiving the insert 70 of the first snap connector 52. The opening 68 extends in the insertion direction i.e. from top to bottom and in other words from an outer surface 72 into the second snap connector 54. The upper part of the opening 68, i.e. at the outer surface 72, may have a cross-sectional shape corresponding to a circumferential outline of the insert 70. For example, at least one protrusion 74 may be formed in a direction substantially perpendicular to the inserting direction in the opening 68. At least one protrusion 74 of the opening 68 may correspond to a recess 76 formed in the first snap connector 52, as illustrated on the right-hand side in FIG. 6a. When the protrusions 74 are flush with the recesses 76 and when a rotational axis 78 of the first snap connector 52 coincides with a longitudinal axis 80 of the second snap connector 54, the first snap connector 52 can be inserted into the second snap connector 54. When the first snap connector 52 is rotated about the rotational axis 78, parts of the first snap connector 52 will be held by the protrusions 74. In this example, three protrusions 74 are symmetrically provided in the second snap connector 54, such that a rotation of about 60° after inserting the first snap connector 52 will clamp the snap connectors 52 and 54 with each other. In axial direction, an outer surface 82 of the first snap connector 52 is flushly arranged on the outer surface 72 of the second snap connector 54. Exemplarily, these surfaces 72 and 82 are spherically curved.

In FIGS. 6c and 6d, an exemplary embodiment of the elongate compensation element 46 and its connection to the frame elements 22 is shown. Here, the elongate compensation element 46 has a cross-sectional surface that is based on a circle and has radial cut-outs 84. Here, the number of cut-outs 84 conforms the number of protrusions 74 of the second snap connector 54. The cut-outs 84 are evenly distributed in the circumferential direction. Sections 86 between the cut-outs 84 comprise first circumferential grooves 88, which corresponded to second circumferential grooves 90 inside the frame element 22. Here, the cross-sectional surface has three projections 92, which each comprise the second grooves 90. Thus, the elongate compensation element 46 can be inserted into an opening 94 of the module frame 21 in a first rotational direction, in which the sections 86 are arranged between the projections 92 and of the opening 94. By rotating the elongate compensation element 46, the grooves 88 and 90 engage and the longitudinal position of the elongate compensation element 46 is fixed. Thus, this arrangement constitutes an arresting element 95 The placement of the projections 92 should be adapted to the placement of the protrusions 74, such that the position of the elongate compensation element 46 can be chosen when inserting the insert 70 into the opening 68. A subsequent rotation about 60° leads to locking the two snap connectors 52 and 54 as well as the elongate compensation element 46 in the frame element 22. Thus, a tolerance compensation is achieved at the same time as a fixation to the second carrier element 44.

Figure 7:
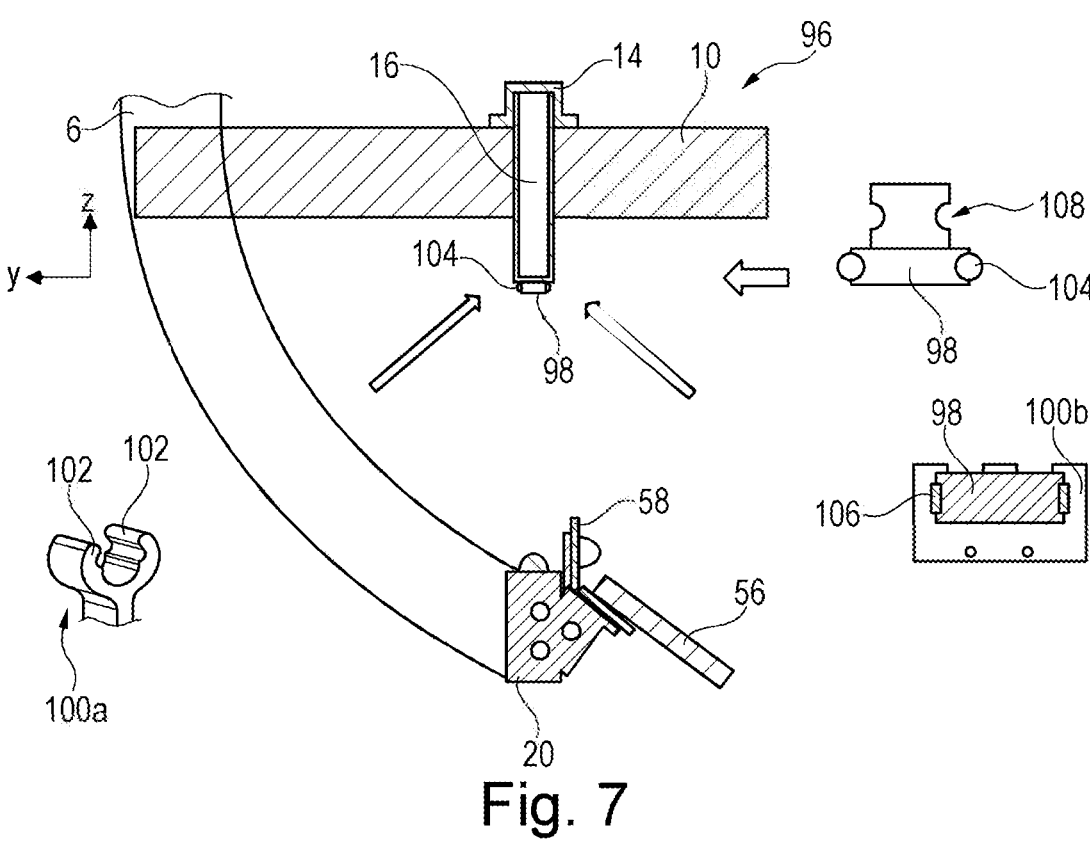
FIG. 7 shows a structure system using a rail.

FIG. 7 shows a further exemplary embodiment of a structure system 96, in which the first carrier element is provided in the form of a rail 98. A first coupling device 100a or 100b may be attached to the rail 98. The first coupling device 100a is designed as a guide element that comprises two opposed troughs 102, that correspond to guide rollers 104 of the rail 98. Similar to this, the first coupling device 100b is based on cylindrical rollers 106. The rail 98 may be attached to the seat rail 14 through the first attachment devices 16 and comprises a suitable interface 108 for this purpose.

Figure 8:
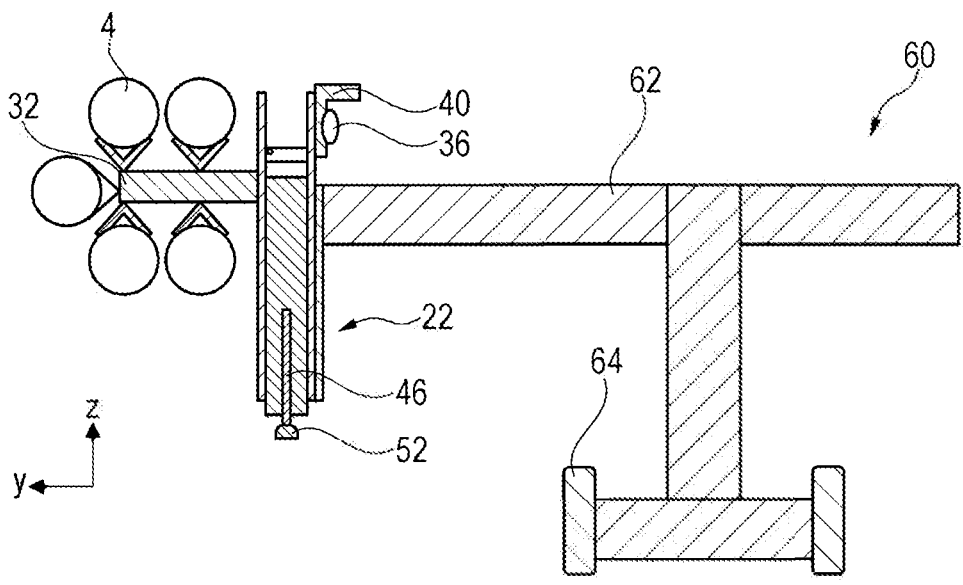
FIG. 8 shows pre-equipment of a module frame with a rail.

The jig 60 as shown in FIG. 8 only needs to provide the pre-installed module frame 21 at a starting point of the rail 98 and the module frame 21 can be moved along the rail 98 into the interior of the fuselage structure 6.

Figure 3:
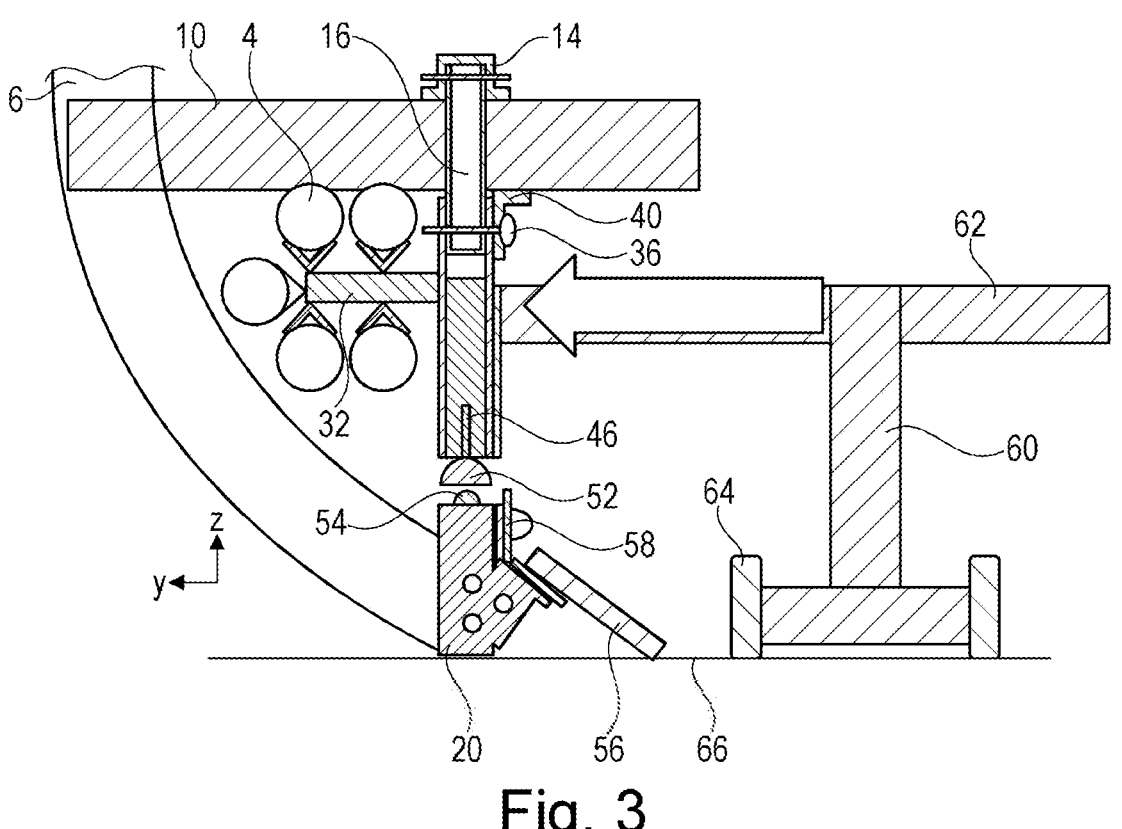
FIG. 3 shows the jig of FIG. 2 being placed inside the interior structure.
Figure 9:
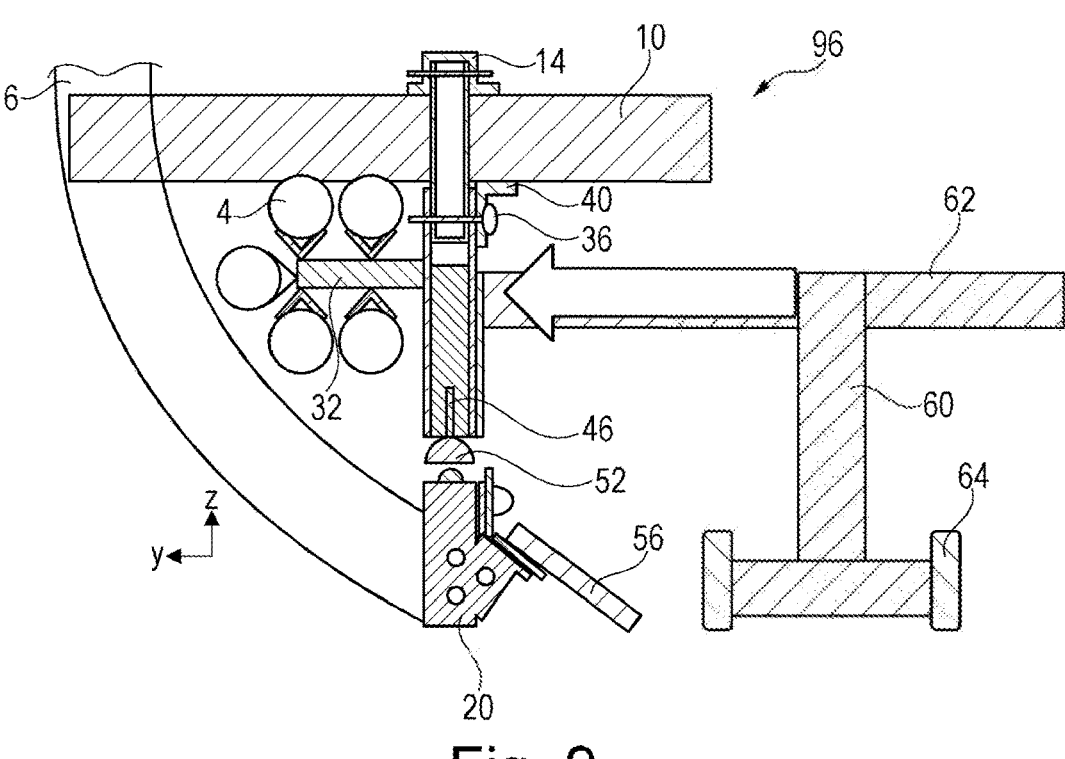
FIG. 9 shows insertion of the pre-equipped module frame into the structure through a jig.
Figure 10:
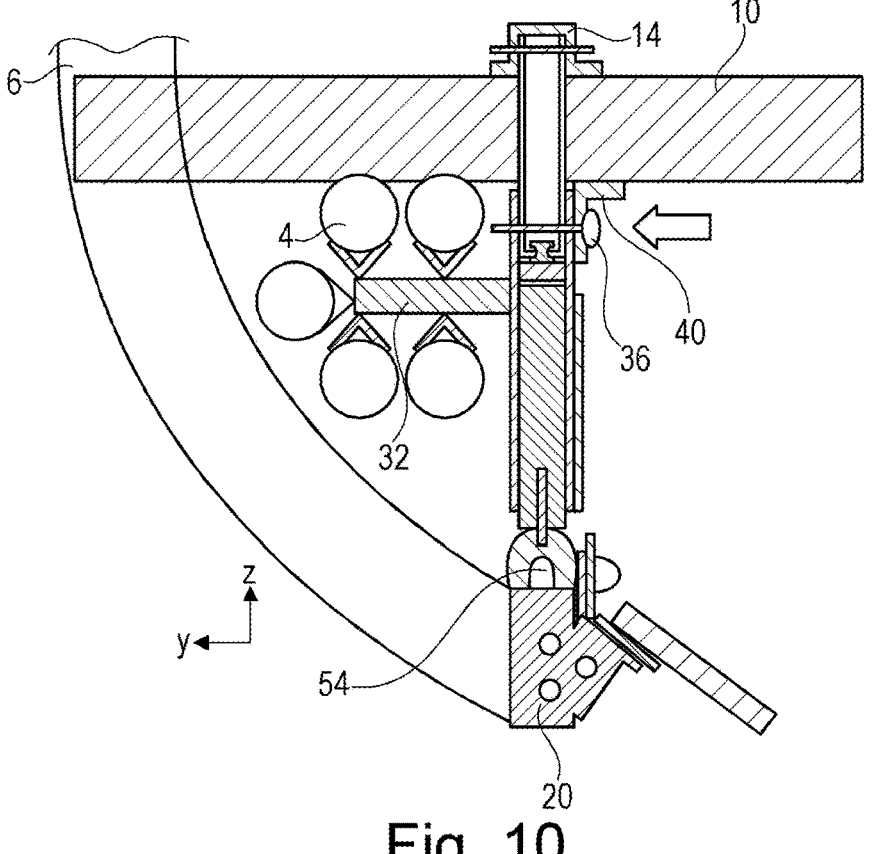
FIG. 10 shows the coupling of the first coupling devices with the first carrier element.
Figure 11:
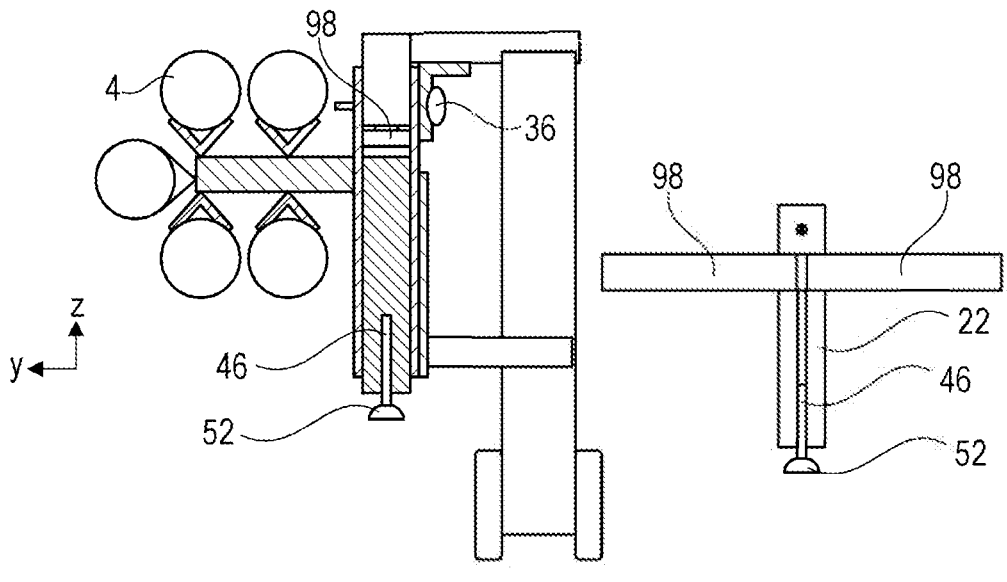
FIG. 11 shows insertion of a small jig into the structure with several rails being arranged between consecutive module frame components.
Figure 12:
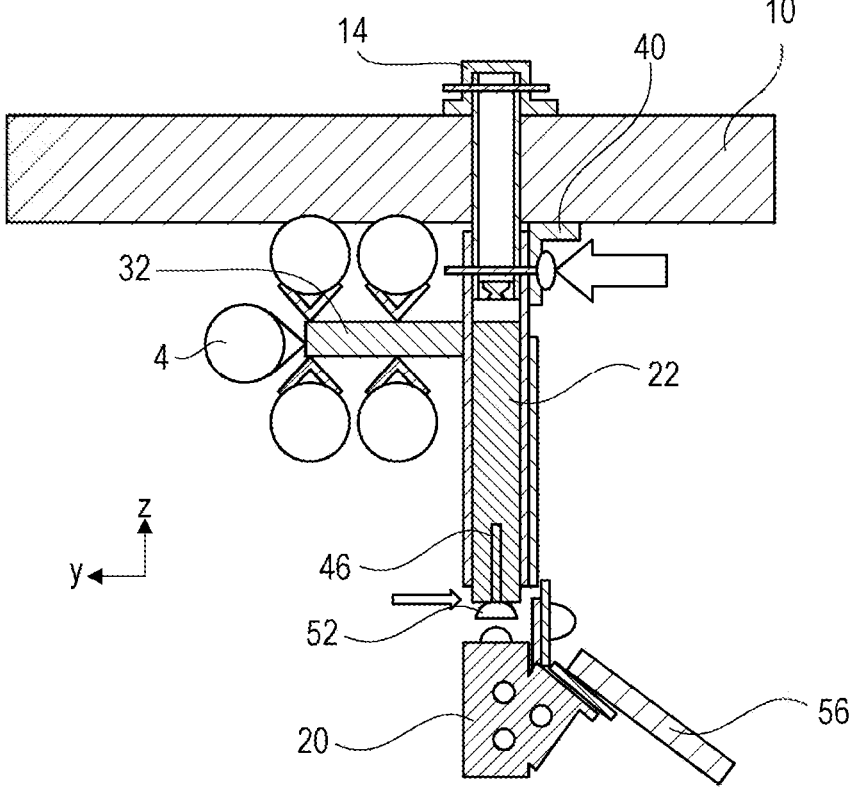
FIG. 12 shows the fastening of the module frame.
Figures 13, 14:
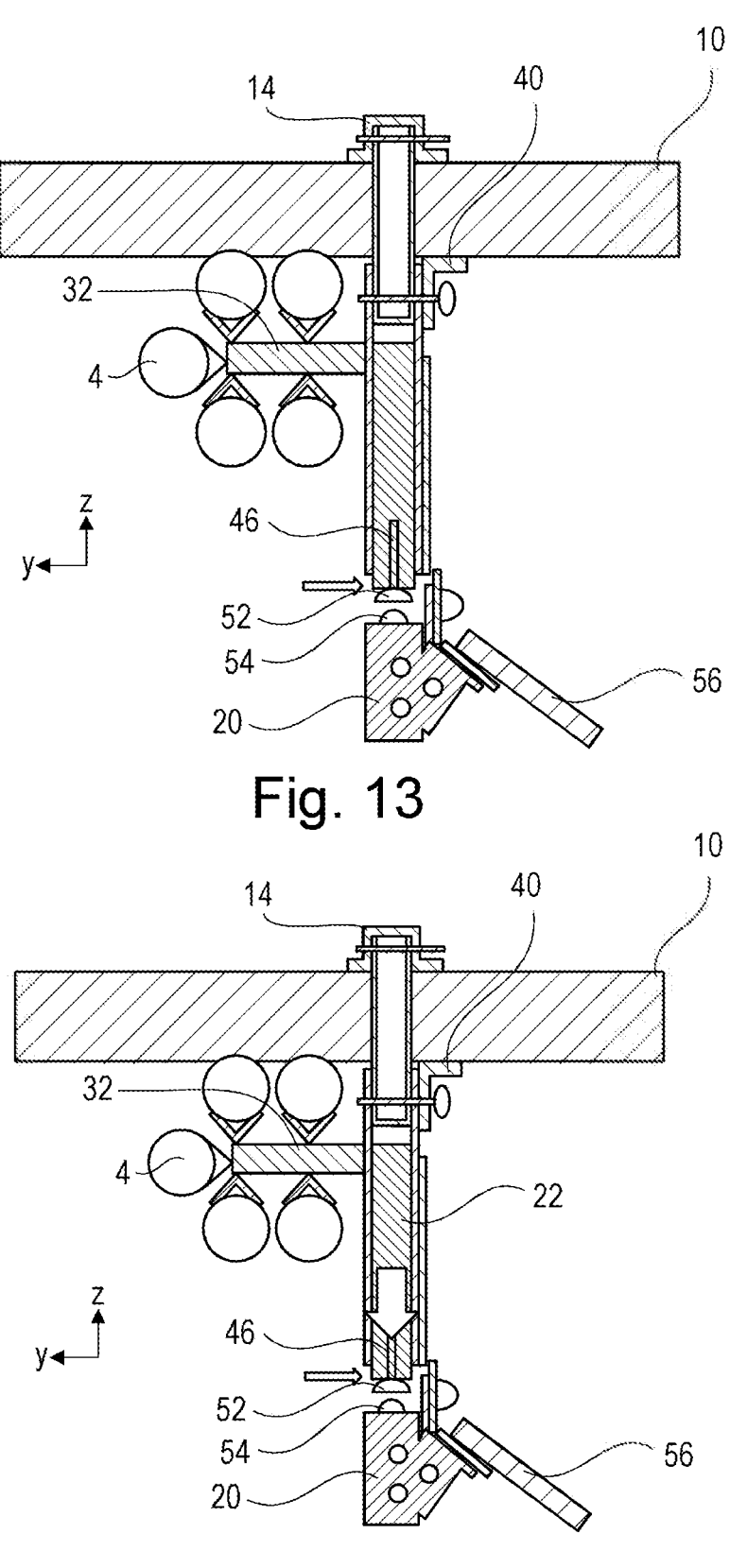
FIG. 13 shows the rails being removed.
FIG. 14 shows the second snap connector being moved and connected.

Afterwards, as shown in FIGS. 9 and 10, the module frame 21 is attached to the fuselage structure 6 in a similar manner as shown in FIGS. 3 to 5.

As shown in FIGS. 11 to 14, the frame elements 22 are temporarily coupled with rails 98, which are used for inserting the frame elements 22 into the fuselage structure 6. Afterwards, the rails 98 are removed to provide the fastening steps in analogy to FIGS. 3 to 5 and 7 to 10.

Figures 15, 16:
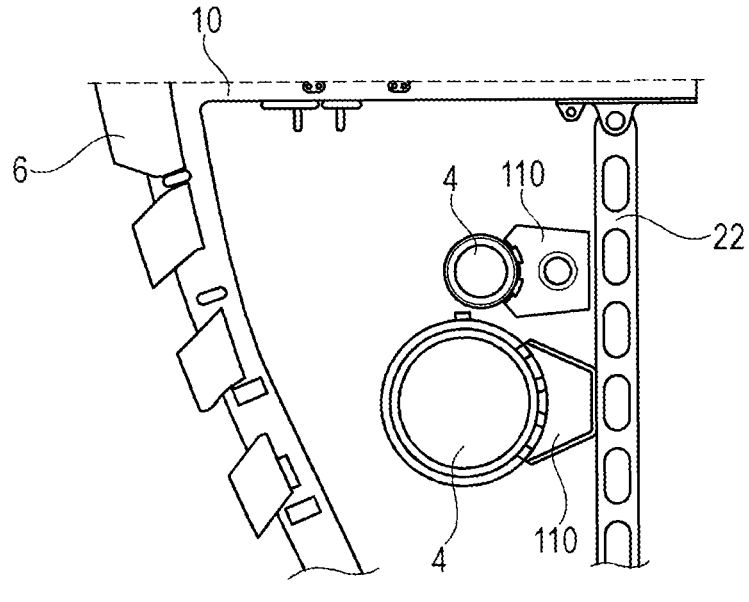
FIG. 15 shows holders for holding equipment components.
FIG. 16 shows flexible brackets for holding different equipment components.
Figures 17A, 17B:
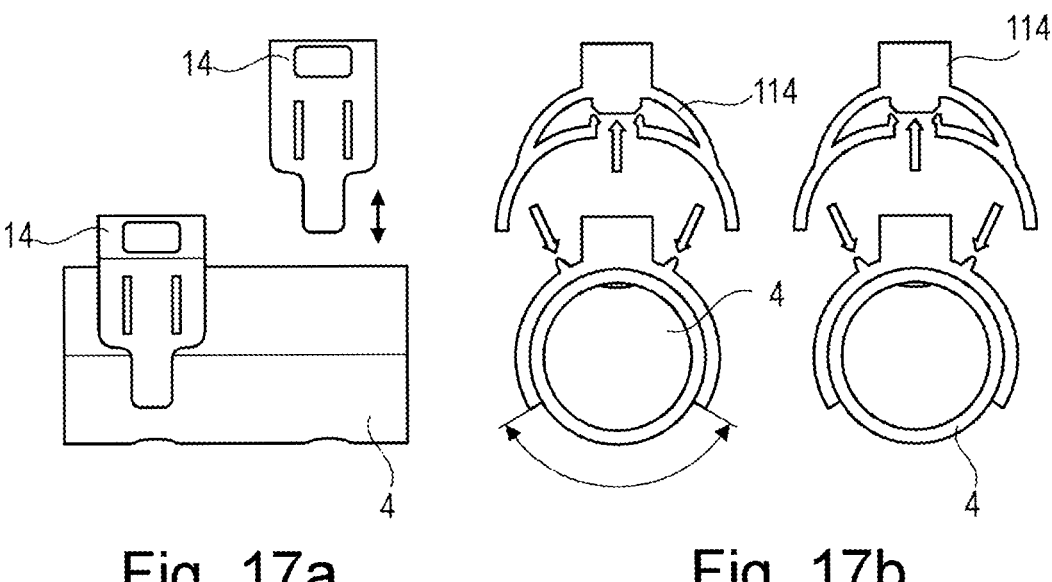
FIG. 17a shows examples of brackets.
FIG. 17b shows additional examples of brackets.

FIG. 15 shows further holders 110 for holding the equipment components 4 in form of lines or ducts. Here, individual holders 110 are attached to the frame elements 22. FIG. 16 schematically illustrates a flexible bracket 112 to handle variable pipe diameters and to compensate system tolerances. FIGS. 17a and 17b shows still further holders 114 to provide a snap and click connection for pipes and ducts.

Figure 18:
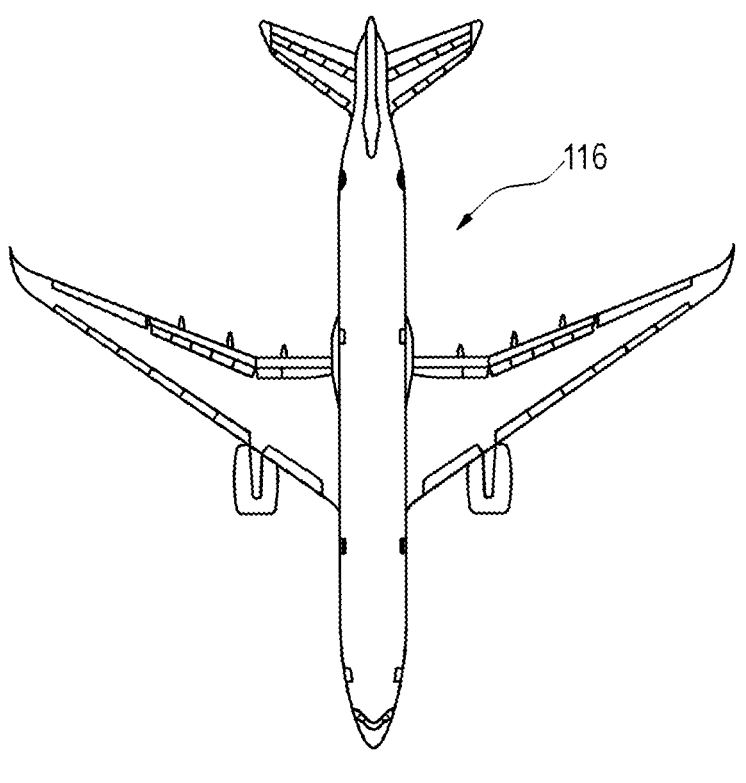
FIG. 18 shows an aircraft that may be used in accordance with the present invention.

FIG. 18 shows an aircraft 116 having a fuselage structure 6, into which the above-described installation system is integrated.

Figure 19:
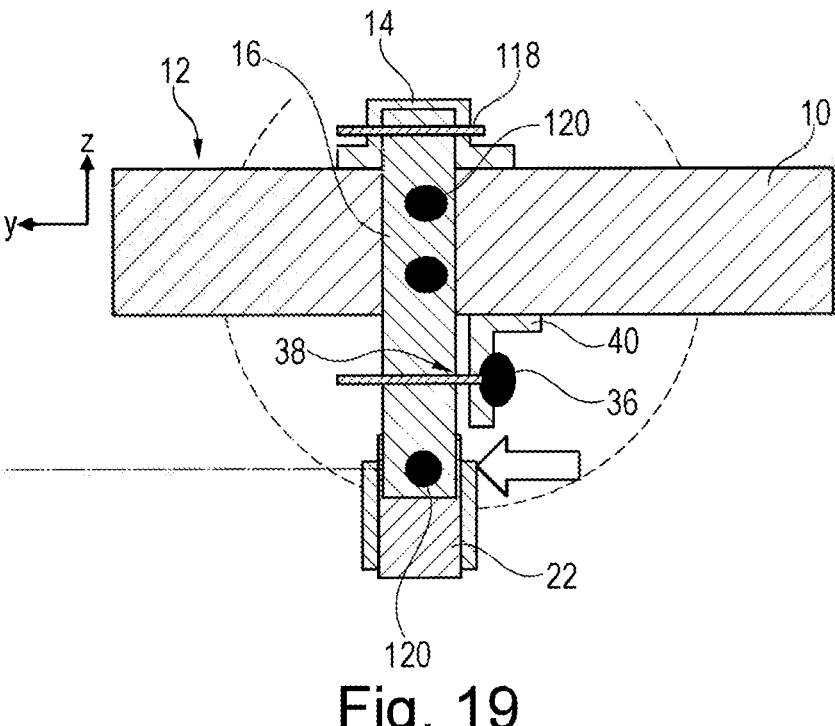
FIG. 19 shows a modified attachment of a module frame.

FIG. 19 shows a modified arrangement of the structure system 2 of FIG. 1. Here, the first attachment devices 16 are attached to the crossbeams 10 through a single bolt 118 at the seat rail 14, as well as through fasteners 120, which may be self-piercing rivets. While the closing angle 40 is attached through the fastening element 36 in the same way as in FIG. 1, the frame element 22 is coupled with the first attachment device 16 through fasteners 120 as well. Here, the connection to the first attachment device 16 may be provided in the form of a fork and lug arrangement.

Figure 20:
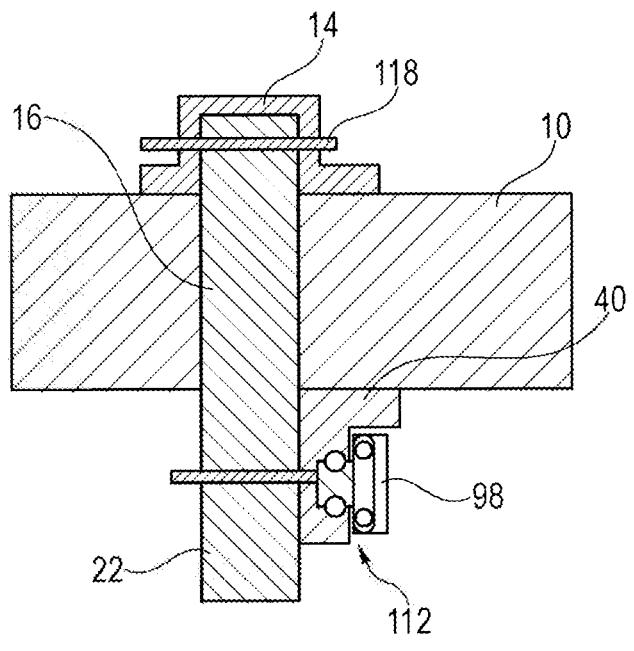
FIG. 20 shows a modified attachment of a module frame.

In FIG. 20, a removable rail adapter 122 is shown, which is attachable to the closing angle 40 and comprises a rail 98, which extends parallel to the longitudinal axis of the aircraft, into which the frame element 22 is to be installed. The removed rail adapter 122 is further shown in FIG. 22.

FIG. 21 shows a connection of the frame element 22 to both the first attachment device 16 and the second carrier element 20 through rotary joints 124, which allow to avoid constraint forces between the structure of the aircraft and the frame element 22.

Lastly, FIGS. 22a-22c shows a further rail adapter 122, which is arrangeable on another first attachment device 16, e.g. at an adjacent seat rail 14, in order to carry a larger jig for moving module frames 21 along the aircraft structure to a desired installation position. Instead of a rail adapter 122 at another first attachment device 16, also a rail adapter may be placed at the second carrier element 20.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 structure system
4 equipment component
6 fuselage structure
8 triangle region
10 crossbeam
12 top side
14 seat rail
16 first attachment device
18 first carrier element
20 second carrier element
21 module frame
22 elongate frame element
24 first end
26 second end
28 first lateral face
30 second lateral face
32 component holder
34 first coupling device
36 fastening element
38 through-hole
40 closing angle
42 second coupling device
44 second carrier element
46 elongate compensation element
48 inner end
50 outer end
52 first snap connector
54 second snap connector
56 cargo compartment floor
58 closing angle
60 mounting jig
62 carrying frame
64 wheel
66 floor
68 opening
70 insert
72 outer surface
74 protrusion
76 recess
78 rotational axis
80 longitudinal axis
82 outer surface
84 radial cutout
86 section
88 first circumferential groove
90 second circumferential groove
92 projection
94 opening
95 arresting element
96 structure system
98 rail
100a, 100b first coupling device
102 trough
104 guide roller
106 cylindrical roller
108 interface
110 holder
112 flexible bracket
114 holder
116 aircraft
118 bolt
120 fastener
122 rail adapter
124 rotary joint

The invention claimed is:

1. A structure system for installation into a fuselage structure in an interior of an aircraft, comprising:
a first carrier element,
a second carrier element,
at least one elongate frame element having a first end and a second end,
at least one first attachment device for attaching the first carrier element to the fuselage structure or to an element coupled with the fuselage structure,
at least one first coupling device mounted to the first end for coupling the first carrier element to the at least one elongate frame element, and
at least one second coupling device mounted to the second end for coupling the second carrier element to the at least one elongate frame element,
wherein the at least one elongate frame element is configured for holding at least one component to be installed in the interior,
wherein the first carrier element is configured for coupling with the at least one first coupling device,
wherein the second carrier element is configured for coupling with the at least one second coupling device, and
wherein one of the at least one first coupling device and the at least one second coupling device is configured to snap into the respective carrier element, to be moved relative to the respective end of the at least one elongate frame element and to be arrested in a desired relative position thereto,
wherein the at least one first attachment device is configured to be connected or integrated into a cabin seat rail at a bottom side, such that the at least one elongate frame element is placeable underneath and is couplable with the seat rail.

2. The structure system of claim 1, wherein the at least one second coupling device comprises an elongate compensation element having an outer end, which protrudes away from the at least one elongate frame element, and an inner end,
wherein the elongate compensation element is slidably supported in the respective frame element to move the outer end into a variable distance from the second end, and
wherein a first snap connector is arranged on the outer end that is complementary shaped to a second snap connector arranged in the second carrier element.

3. The structure system of claim 2, wherein the one of the first snap connector and the second snap connector is configured to receive the other one of the first snap connector and the second snap connector in a first relative rotational position and to hold it in at least one second relative rotational position that is distinct from the first relative rotational position.

4. The structure system of claim 2, wherein the at least one second coupling device comprises an arresting element configured for arresting the elongate compensation element relative to the second end.

5. The structure system of claim 4, wherein the arresting element is integrated into the elongate compensation element.

6. The structure system of claim 1, wherein one of the first carrier element and the second carrier element comprises at least one rail, and wherein the respective coupling device is configured for being slidably supported by the at least one rail to move the at least one elongate frame element to the respective carrier element.

7. The structure system of claim 6, wherein the respective coupling device and the respective carrier element are connectable independent from the at least one rail, and wherein the at least one rail is configured to be removed from the respective carrier element after connecting the respective coupling device and the respective carrier element.

8. The structure system of claim 1, wherein a plurality of consecutive frame elements are connectable through at least one profile component that extends along a plurality of first ends or a plurality of second ends.

9. The structure system of claim 1, wherein at least one of the at least one first coupling device and the at least one second coupling device comprises a fastening element configured to stick through the at least one frame element and the respective coupling device.

10. A method for mounting structural and equipment components to a fuselage structure in an interior of an aircraft, the method comprising the steps of:

providing at least one frame element having a first end and a second end, attaching at least one component on the at least one frame element, moving the at least one frame element into the fuselage structure, coupling at least one first coupling device mounted to the first end to a first carrier element attached to the fuselage structure through at least one first attachment device, and coupling at least one second coupling device mounted to the second end to a second carrier element attached to the fuselage structure, wherein the coupling of one of the at least one first coupling device and the at least one second coupling device includes a snapping into the respective carrier element, to be moved relative to the respective end of the frame element and to be arrested in a desired relative position thereto, wherein the at least one first attachment device is configured to be connected or integrated into a cabin seat rail at a bottom side, such that the at least one frame element is placed underneath and is coupled with the seat rail.

11. The method according to claim 10, further comprising sliding an elongate compensation element at the second coupling device, the elongate compensation element having an outer end protruding away from the respective frame element and an inner end, to move the outer end into a distance from the second end, such that a first snap connector arranged on the outer end reaches a complementary shaped second snap connector arranged in the second carrier element, and snapping the first snap connector into the second snap connector.

12. A vehicle comprising:

a fuselage structure, at least one component, and the structure system according to claim 1 for attaching the at least one component to the fuselage structure.

13. The vehicle according to claim 12, wherein the at least one component comprises a fluid pipe, a duct, or an electric line.

14. The vehicle according to claim 12, wherein the vehicle is an aircraft, and wherein the structure system is configured to arrange the at least one component in a triangle region of the aircraft.

* * * * *